United States Patent
Tomoguchi et al.

(10) Patent No.: US 9,650,482 B2
(45) Date of Patent: May 16, 2017

(54) METHOD OF PRODUCING LAMINATE

(71) Applicant: NITTO DENKO CORPORATION, Ibaraki-shi, Osaka (JP)

(72) Inventors: Naoki Tomoguchi, Ibaraki (JP); Toshihiro Kanno, Ibaraki (JP); Satoru Kunikata, Ibaraki (JP); Kentarou Yoshida, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 366 days.

(21) Appl. No.: 14/304,125

(22) Filed: Jun. 13, 2014

(65) Prior Publication Data
US 2015/0010763 A1  Jan. 8, 2015

(30) Foreign Application Priority Data
Jul. 4, 2013  (JP) .................. 2013-140345

(51) Int. Cl.
 B29D 11/00 (2006.01)
 C08J 7/04 (2006.01)

(52) U.S. Cl.
CPC ........... C08J 7/047 (2013.01); B29D 11/0073 (2013.01); *C08J 2367/02* (2013.01); *C08J 2429/04* (2013.01); *Y10T 428/31855* (2015.04)

(58) Field of Classification Search
CPC ... B29D 11/0073; C08J 7/047; C08J 2367/02; C08J 2429/04; Y10T 428/31855
USPC ....................................... 428/500; 427/163.1
See application file for complete search history.

(56) References Cited

U.S. PATENT DOCUMENTS

| | | | |
|---|---|---|---|
| 8,767,295 B2 | 7/2014 | Murakami et al. | |
| 2012/0057230 A1 | 3/2012 | Murakami et al. | |
| 2012/0077018 A1 | 3/2012 | Makihata et al. | |
| 2014/0044953 A1* | 2/2014 | Tomoguchi | C09J 7/0207 |
| | | | 428/317.3 |

FOREIGN PATENT DOCUMENTS

| | | |
|---|---|---|
| JP | 2001-343521 A | 12/2001 |
| JP | 2002-144419 A | 5/2002 |
| JP | 2002-346312 A | 12/2002 |
| JP | 2010-280856 A | 12/2010 |
| JP | 2012-229305 A | 11/2012 |
| TW | 201116563 A | 5/2011 |
| TW | 201247837 A1 | 12/2012 |

OTHER PUBLICATIONS

Roki Techno product catalog (http://www.rokitechno.com/products/filter/catalog-search/), SHP type (Polypropylene Media), Slope-Pure Filter Cartridges, http://www.rokitechno.com/pdf/SHP-P_E.pdf, Mar. 8, 2007; cited in Taiwanese Office Action dated Dec. 7, 2016.
Office Action dated Dec. 7, 2016, issued in counterpart Japanese Patent Application No. 2013-140345, with English translation. (6 pages).
Office Action dated Dec. 7, 2016, issued in counterpart Taiwanese Application No. 103121030, with English translation. (13 pages).

* cited by examiner

*Primary Examiner* — Ling Choi
*Assistant Examiner* — Chun-Cheng Wang
(74) *Attorney, Agent, or Firm* — Westerman, Hattori, Daniels & Adrian, LLP

(57) ABSTRACT

A method of producing a laminate according to an embodiment of the present invention includes applying an application liquid containing a polyvinyl alcohol-based resin to one side of a resin substrate, followed by drying of the application liquid to form a polyvinyl alcohol-based resin layer. The method includes: passing the application liquid before the application through a depth-type filter having a filtration accuracy of from 50 μm to 100 μm; and fluctuating a pressure applied to the application liquid supplied to the depth-type filter to remove air bubbles in the filter.

5 Claims, 3 Drawing Sheets

METHOD OF PRODUCING LAMINATE

This application claims priority under 35 U.S.C. Section 119 to Japanese Patent Application No. 2013-140345 filed on Jul. 4, 2013, which is herein incorporated by reference.

BACKGROUND OF THE INVENTION

1. Field of the Invention

The present invention relates to a method of producing a laminate.

2. Description of the Related Art

A polarizing film is placed on each of both sides of a liquid crystal cell of a liquid crystal display apparatus as a typical image display apparatus, the placement being attributable to an image-forming system of the apparatus. As a method of producing the polarizing film, for example, there has been proposed a method involving stretching a laminate including a resin substrate and a polyvinyl alcohol (PVA)-based resin layer, and immersing the stretched laminate in a dyeing liquid to provide a polarizing film (for example, Japanese Patent Application Laid-open No. 2001-343521). Such method has been attracting attention as a potential approach to contributing to thinning of the liquid crystal display apparatus in recent years because the method provides a polarizing film having a small thickness. The PVA-based resin layer is formed by applying and drying an application liquid containing a PVA-based resin. It is desirable to remove air bubbles from the application liquid because presence of the air bubbles in the application liquid causes a streak- or dot-like external appearance defect in the PVA-based resin layer to be formed. As a technology for removing the air bubbles in the application liquid, there has been known a technology involving passing a film-forming raw material using a PVA-based polymer as a constituent component through a filter in production of a PVA-based polymer film (for example, Japanese Patent Application Laid-open No. 2002-144419). However, in the related art, it is difficult to remove air bubbles in the filter when the film-forming raw material (i.e., the application liquid) is passed through the filter (substantially when the filter is filled with the application liquid in association with the passage). As a result, it is difficult to remove the air bubbles from the application liquid. Even if the air bubbles can be removed, the removal requires much time, which results in insufficient productivity.

SUMMARY OF THE INVENTION

According to an embodiment of the present invention, there is provided a production method which is excellent in productivity and by which a laminate whose external appearance defects have been suppressed can be obtained.

A method of producing a laminate according to an embodiment of the present invention includes applying an application liquid containing a polyvinyl alcohol-based resin to one side of a resin substrate, followed by drying of the application liquid to form a polyvinyl alcohol-based resin layer. The method includes: passing the application liquid before the application through a depth-type filter having a filtration accuracy of from 50 μm to 100 μm; and fluctuating a pressure applied to the application liquid supplied to the depth-type filter to remove air bubbles in the filter.

In one embodiment of the present invention, the fluctuating of the pressure is performed by intermittently stopping a pump for supplying the application liquid to the depth-type filter.

In one embodiment of the present invention, a difference between a maximum pressure and a minimum pressure in the fluctuating of the pressure is from 0.10 MPa to 0.25 MPa.

In one embodiment of the present invention, the application liquid has a viscosity of from 100 mPa·s to 10,000 mPa·s.

In one embodiment of the present invention, the method further includes stretching the resin substrate having formed thereon the polyvinyl alcohol-based resin layer.

According to another aspect of the present invention, a laminate is provided. The laminate is obtained by the above-mentioned method. The laminate includes: a resin substrate; and a polyvinyl alcohol-based resin layer formed on one side of the resin substrate, wherein a number of air bubble defects of the polyvinyl alcohol-based resin layer is 1 defect/m$^2$ or less.

DETAILED DESCRIPTION OF THE PREFERRED EMBODIMENTS

Figure 1:
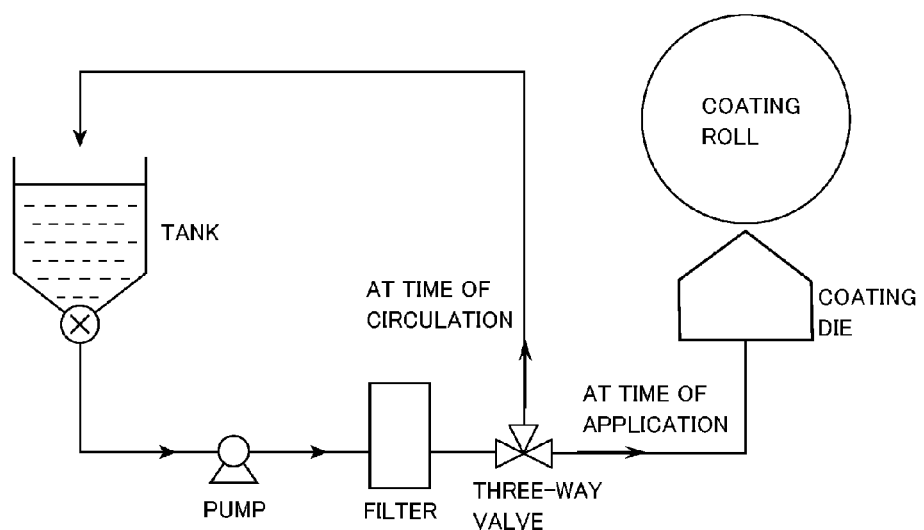
FIG. 1 is a schematic view illustrating an example of the removal of the air bubbles, foreign matter, and the like of an application liquid in a production method according to an embodiment of the present invention.

Embodiments of the present invention are described below. However, the present invention is not limited to these embodiments.

A. Method of Producing Laminate

A-1. Outline of Production Method

A method of producing a laminate according to one embodiment of the present invention includes applying an application liquid containing a polyvinyl alcohol (PVA)-based resin to one side of a resin substrate, followed by the drying of the application liquid to form a PVA-based resin layer. The method of producing a laminate of the present invention includes: passing the application liquid before the application through a depth-type filter having a filtration accuracy of from 50 μm to 100 μm; and fluctuating a pressure applied to the application liquid supplied to the depth-type filter to remove air bubbles in the filter. A typical embodiment of the production method is described below.

A-2. Preparation of Resin Substrate

The resin substrate is typically formed of a thermoplastic resin. Any appropriate resin is used as the thermoplastic resin. Examples thereof include (meth) acrylic resins, olefin-based resins, norbornene-based resins, and polyester-based resins. The polyester-based resins are preferably used. Of those, amorphous (uncrystallized) polyethylene terephthalate-based resins are preferably used. A noncrystalline (hard-to-crystallize) polyethylene terephthalate-based resin is particularly preferably used. Specific examples of the noncrystalline polyethylene terephthalate-based resins include a copolymer further containing isophthalic acid as a dicarboxylic acid and a copolymer further containing cyclohexanedimethanol as a glycol.

When an underwater stretching mode is adopted in a stretching treatment to be described later, the above-described preferred resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature of less than 60° C. is permitted as long as the resin substrate does not deform during the application and drying of the application liquid containing the PVA-based resin. It should be noted that the glass transition temperature of the resin substrate can be adjusted by, for example, introducing a modification group into the constituent material or heating the substrate constituted of a crystallization material. The glass transition temperature (Tg) is a value determined in conformity with JIS K 7121.

The thickness of the resin substrate is preferably from 20 μm to 300 μm, more preferably from 30 μm to 200 μm.

The resin substrate may be subjected to a surface treatment (such as a corona treatment) in advance. This is because adhesiveness between the resin substrate and the PVA-based resin layer can be improved.

A-3. Formation of Polyvinyl Alcohol-Based Resin Layer

A-3-1. Polyvinyl Alcohol-Based Resin

Any appropriate resin may be adopted as the PVA-based resin for forming the PVA-based resin layer. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

A-3-2. Preparation of Application Liquid

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

The viscosity of the application liquid is preferably from 100 mPa·s to 10,000 mPa·s, more preferably from 300 mPa·s to 5,000 mPa·s, still more preferably from 500 mPa·s to 3,000 mPa·s.

A-3-3. Removal of Air Bubbles, Foreign Matter, and the Like of Application Liquid As described above, the production method according to an embodiment of the present invention includes passing the application liquid through a predetermined filter. FIG. 1 is a schematic view illustrating an example of the removal of air bubbles, foreign matter, and the like in the production method according to an embodiment of the present invention. As illustrated in FIG. 1, a system for removing the air bubbles, foreign matter, and the like of the application liquid includes a tank, a liquid-feeding pump, and a filter provided in series. The application liquid is supplied to the filter by the pump and then the application liquid is filtered in the filter, whereby foreign matter and the like in the application liquid can be removed. Further, as described in detail later, a depth-type filter having predetermined filtration accuracy is used as the filter and a pressure applied to the application liquid supplied to the filter is fluctuated, whereby air bubbles in the filter can be rapidly and sufficiently removed. As a result, the air bubbles of the application liquid can be removed. The illustrated example is a circulating system that returns the filtered application liquid to the tank. The removal of the air bubbles, foreign matter, and the like of the application liquid may be performed with such circulating system as illustrated in FIG. 1 bypassing the application liquid through the filter a plurality of times, or may be performed by passing the application liquid through the filter only once. The number of times that the application liquid is passed through the filter (a circulation time in the case of the circulating system) can be appropriately set depending on, for example, purposes, the applications of the laminate, and the state of the application liquid.

The removal of the air bubbles, foreign matter, and the like in such circulating system as illustrated in FIG. 1 is described more specifically. As described above, the application liquid before the application is supplied to the filter by the pump, and when the application liquid passes the filter, its foreign matter and the like are filtered out by the filter. The application liquid is fed to an application die (also referred to as "coating die") and then applied from the application die to the resin substrate (section A-3-4 to be described later), or is returned to the tank to be circulated, by switching the opening of a three-way valve. When the application to the resin substrate is started (when the three-way valve is opened toward the application die), a liquid-feeding system (particularly the inside of the filter) is preferably filled with the application liquid to a sufficient extent. That is, the application liquid preferably passes the filter in a state of sufficiently filling the liquid-feeding system. When such filling is insufficient, air bubbles escape from the inside of the filter into the application liquid and hence the air bubbles are present in the application liquid in many cases. As a result, there are many cases where a defect occurs in the PVA-based resin layer to be obtained and leads to a reduction in quality. As described later, according to the present invention, a depth-type filter having predetermined filtration accuracy is used and a pressure applied to the application liquid supplied to the filter is fluctuated, whereby the air bubbles in the filter can be rapidly and sufficiently removed. As a result, the air bubbles in the application liquid can be sufficiently removed.

As described above, the removal of the air bubbles, foreign matter, and the like of the application liquid is performed with the depth-type filter. Any appropriate construction can be adopted as the depth-type filter. Specifically, for example, any one of the following types, which are classified depending on the form of a filter material, is adopted: a thread winding type obtained by winding thread around a cylindrical core, a nonwoven fabric lamination type obtained by winding a nonwoven fabric around a cylindrical core, and a formed resin type using a formed resin article such as sponge. A constituent material for the filter material is, for example, a polyolefin-based conjugated fiber or a heat-bondable polyester fiber. Typically, the depth-type filter is attached to a pressure container (housing), and removes the air bubbles and/or foreign matter in a liquid to be filtered (a PVA-based application liquid in the present invention) with the thickness of the filter material by pressurizing the liquid to flow the liquid from the outside of the filter in the housing to the inside thereof. In addition to the depth-type filter, a surface-type filter (such as a pleated filter) is known as the filter. However, in the present invention, the depth-type filter is used from the viewpoints of, for example, the removal of air bubbles, a filtration ability, and durability.

The depth-type filter has been commercially available as a cartridge-type filter. In the present invention, such commercial depth-type filter can also be suitably used. Specific examples of such commercial product include: a product manufactured by Pall Corporation such as HDCII, Profile, Profile II, Ultipleat Profile, Profile II-Plus, or Petrosorb; a product manufactured by JNC Corporation such as CP FILTER, BM FILTER, POROUSFINE, SUPER WOUND FILTER, STEM FILTER, or GF FILTER; a product manufactured by ROKI TECHNO CO, LTD such as SL Filter, MICRO-CILIA Filter, DIA II Filter, or MICRO-PURE Filter; and a product manufactured by FUJIFILM Corporation such as AstroPore PPE.

The filtration accuracy of the depth-type filter is from 50 μm to 100 μm, preferably from 60 μm to 100 μm, more preferably from 70 μm to 100 μm. The term "filtration accuracy" refers to the minimum particle diameter with which, when a liquid obtained by dispersing test powder 1 specified in JIS Z8901 at 0.3 ppm in pure water is filtered, 99.9% or more of the powder can be separated. Therefore, a larger value for the filtration accuracy means that the diameter of a particle that can be filtered out increases (that is, the filtration accuracy reduces and the mesh of the filter becomes coarser). The value for the filtration accuracy of the depth-type filter to be used in the present invention is much larger than filtration accuracy desired for ordinary microfiltration (e.g., 20 μm or less). Accordingly, the present invention is based on a technical idea antithetical to an ordinary one in which an air bubble removal ratio is increased with a filter having relatively low filtration accuracy. Here, as described above, when the filling of the filter with the application liquid upon initiation of the application to the resin substrate is insufficient, there are many cases where air bubbles escape from the inside of the filter into the application liquid, and hence a defect occurs in the PVA-based resin layer to be obtained and leads to a reduction in quality. Accordingly, voids in the filter need to be completely filled with the application liquid. However, such filling results in poor production efficiency because the filling typically requires long-term circulation of the application liquid. In the present invention, a depth-type filter having relatively low filtration accuracy is used, and when the filter is filled with the application liquid, a pressure applied to the application liquid supplied to the filter is fluctuated, whereby air remaining in the voids in the filter can be swollen and merged. As a result, the air in the filter easily escapes, the filter can be rapidly filled with the application liquid, and productivity can be improved. For example, when a pressure of 0.2 MPa applied to the application liquid is released to be the atmospheric pressure, the average diameter of air bubbles that has been about 100 μm during the application of the pressure may increase to about 125 μm.

Figure 2A:
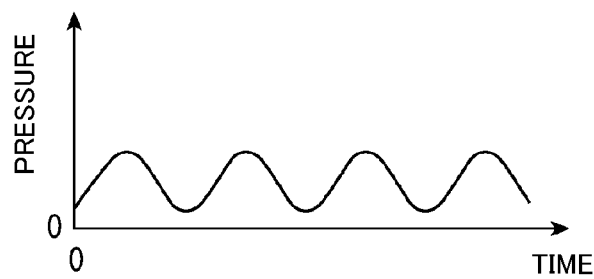
FIGS. 2A to 2D are each a graph showing an example of a pressure fluctuation profile upon air bubble removal in the production method according to an embodiment of the present invention.
Figure 2B:
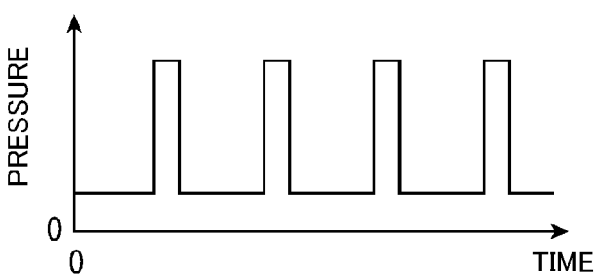
Figure 2C:
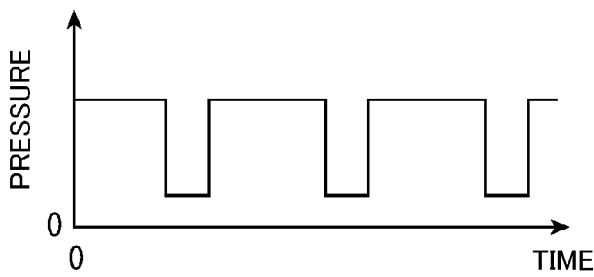
Figure 2D:
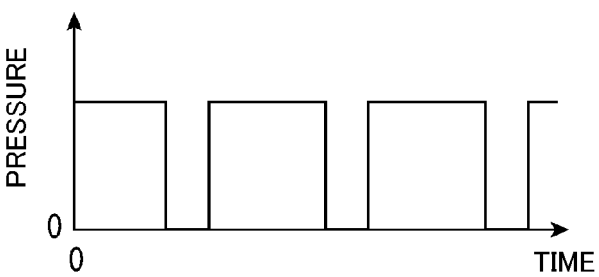

The production method according to an embodiment of the present invention includes fluctuating a pressure applied to the application liquid supplied to the depth-type filter. The pressure fluctuation is performed by changing, for example, the amount of the application liquid ejected from the pump and the output of the pump. The pressure fluctuation can be performed in accordance with any appropriate profile depending on purposes and the kind of the application liquid. For example, the pressure may be fluctuated in a sine curve manner as shown in FIG. 2A, may be fluctuated in a pulse manner as shown in FIG. 2B, or may be fluctuated in accordance with a profile obtained by combining these profiles. In one embodiment, the pressure fluctuation has only to be performed in accordance with such a profile that the pressure applied to the application liquid reduces for at least a certain time period as shown in FIG. 2C, and is preferably performed in accordance with such a profile that the pressure applied to the application liquid becomes zero (the application liquid is placed in an atmospheric pressure state) for at least a certain time period as shown in FIG. 2D. Such pressure fluctuation profile as shown in FIG. 2D can be realized by, for example, intermittently stopping the pump. A difference between the maximum pressure and minimum pressure in the pressure fluctuation is preferably from 0.10

MPa to 0.25 MPa, more preferably from 0.15 MPa to 0.22 MPa. The pressure is fluctuated in accordance with a predetermined profile and/or the difference between the maximum pressure and minimum pressure in the pressure fluctuation is set within such range as described above, whereby, when the average diameter of air bubbles in the filter may increase as described above, the air bubbles in the filter easily escape and the filter can be rapidly filled with the application liquid. As a result, the air bubbles in the application liquid can be satisfactorily removed.

As described above, according to the embodiment of the present invention, the pressure applied to the application liquid is fluctuated and a filter having relatively low filtration accuracy is filled with such application liquid. As a result, air bubbles in the filter, which have heretofore been difficult to be removed, can be removed within a short time period. Consequently, the air bubbles in the application liquid can be satisfactorily removed. An air bubble removal ratio in the application liquid is 90% or more in one embodiment and is 95% or more in another embodiment.

A-3-4. Application and Drying of Application Liquid

Next, the application liquid from which the air bubbles have been removed is applied to the resin substrate. Any appropriate method may be adopted as a method of applying the application liquid. Examples thereof include a roll coating method, a spin coating method, a wire bar coating method, a dip coating method, a die coating method, a curtain coating method, a spray coating method, and a knife coating method (such as a comma coating method).

The application liquid is applied so that the thickness of the PVA-based resin layer after its drying may be preferably from 3 μm to 40 μm, more preferably from 3 μm to 20 μm. The temperature at which the application liquid is applied and dried is preferably 50° C. or more.

Thus, the PVA-based resin layer is formed on the resin substrate.

A-4. Stretching of Resin Substrate

The PVA-based resin layer formed as described above may be an intermediate of a polarizing film (a state where the layer can be subjected to a treatment for turning the layer into the polarizing film), or may be the polarizing film (a state where the layer can be used as the polarizing film).

In such embodiment that the PVA-based resin layer is the intermediate of the polarizing film, the production method of the present invention may further include, as the treatment for turning the layer into the polarizing film, stretching the resin substrate having formed thereon the PVA-based resin layer. Examples of the treatment for turning the layer into the polarizing film include a dyeing treatment, an insolubilizing treatment, a cross-linking treatment, a washing treatment, and a drying treatment in addition to the stretching treatment. Those treatments can be appropriately selected depending on purposes. In addition, the order in which the treatments are performed, the timing of each treatment, the number of times of each treatment, and the like can be appropriately set. Each treatment is described below.

(Dyeing Treatment)

The dyeing treatment is typically performed by dyeing the PVA-based resin layer with iodine. Specifically, the treatment is performed by causing iodine to adsorb to the PVA-based resin layer. A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide so that the solubility of iodine in water may be increased. Specific examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. so that the dissolution of the PVA-based resin may be suppressed. When the PVA-based resin layer is immersed in the dyeing liquid, an immersion time is preferably 5 seconds to 5 minutes so that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

(Stretching Treatment)

The stretching treatment may be of an underwater stretching system in which the treatment is performed while the laminate is immersed in a stretching bath, or may be of an in-air stretching system. An underwater stretching treatment is preferably performed at least once, and the underwater stretching treatment and an in-air stretching treatment are more preferably combined. According to underwater stretching, the PVA-based resin layer can be stretched at a temperature lower than the glass transition temperature (typically about 80° C.) of the resin substrate or the PVA-based resin layer, and can be stretched at a high ratio while its crystallization is suppressed. As a result, a polarizing film having excellent optical characteristics (such as a polarization degree) can be produced.

Any appropriate method may be adopted as a method of stretching the laminate. Specifically, fixed-end stretching may be adopted or free-end stretching (such as a method involving passing the laminate through rolls having different peripheral speeds to uniaxially stretch the laminate) may be adopted. The stretching of the laminate may be performed in one stage, or may be performed in a plurality of stages. When the stretching is performed in a plurality of stages, the stretching ratio (maximum stretching ratio) of the laminate to be described later is the product of stretching ratios in the respective stages.

Any appropriate directions may be selected as the stretching direction of the laminate. In a preferred embodiment, the laminate having a long shape is stretched in its lengthwise direction.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained.

When the underwater stretching mode is adopted, the laminate is preferably stretched while being immersed in an aqueous solution of boric acid (boric acid underwater stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

The stretching bath (aqueous solution of boric acid) is preferably compounded with an iodide. Compounding the iodide can suppress the elution of iodine which has been caused to adsorb to the PVA-based resin layer. Specific examples of the iodide are as described above. The concentration of the iodide is preferably from 0.05 part by weight to 15 parts by weight, more preferably from 0.5 part by weight to 8 parts by weight with respect to 100 parts by weight of water.

The time period for which the laminate is immersed in the stretching bath is preferably from 15 seconds to 5 minutes.

The stretching ratio (maximum stretching ratio) of the laminate is preferably 5.0 times or more with respect to the original length of the laminate. Such high stretching ratio can be achieved by adopting, for example, the underwater stretching system (boric acid underwater stretching). It should be noted that the term "maximum stretching ratio" as used herein refers to a stretching ratio immediately before the rupture of the laminate and refers to a value lower than the separately confirmed stretching ratio at which the laminate ruptures by 0.2.

The underwater stretching treatment is preferably performed after the dyeing treatment.

(Insolubilizing Treatment)

The insolubilizing treatment is typically performed by immersing the PVA-based resin layer in an aqueous solution of boric acid. Especially when the underwater stretching system is employed, water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed after the production of the laminate and before the underwater stretching treatment or the dyeing treatment.

(Cross-Linking Treatment)

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 4 parts by weight with respect to 100 parts by weight of water. In addition, when the cross-linking treatment is performed after the dyeing treatment, the solution is preferably further compounded with an iodide. Compounding the solution with the iodide can suppress the elution of iodine which has been caused to adsorb to the PVA-based resin layer. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 50° C. The cross-linking treatment is preferably performed before the underwater stretching treatment. In a preferred embodiment, the dyeing treatment, the cross-linking treatment, and the underwater stretching treatment are performed in the stated order.

(Washing Treatment)

The washing treatment is typically performed by immersing the PVA-based resin layer in an aqueous solution of potassium iodide.

(Drying Treatment)

The drying temperature in the drying treatment is preferably 30° C. to 100° C.

The polarizing film is substantially a PVA-based resin film that adsorbs and orients the dichromatic substance (typically, iodine). The thickness of the polarizing film is typically 25 μm or less, preferably 15 μm or less, more preferably 10 μm or less, still more preferably 7 μm or less, particularly preferably 5 μm or less. Meanwhile, the thickness of the polarizing film is preferably 0.5 μm or more, more preferably 1.5 μm or more. The polarizing film preferably shows absorption dichroism at any wavelength in the wavelength range of 380 nm to 780 nm. The polarizing film has a single axis transmittance of preferably 40.0% or more, more preferably 41.0% or more, still more preferably 42.0% or more, particularly preferably 43.0% or more. The polarizing film has a polarization degree of preferably 99.8% or more, more preferably 99.9% or more, still more preferably 99.95% or more.

B. Laminate

Figure 3:
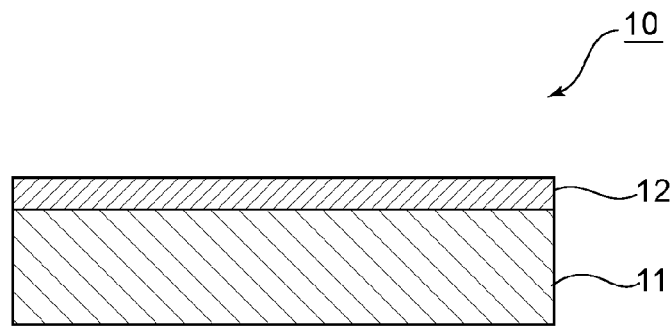
FIG. 3 is a schematic sectional view of a laminate according to an embodiment of the present invention.

A laminate of the present invention is obtained by the production method described in the section A. FIG. 3 is a schematic sectional view of a laminate according to a preferred embodiment of the present invention. A laminate 10 includes a resin substrate 11 and a polyvinyl alcohol (PVA)-based resin layer 12 formed on one side of the resin substrate 11. The laminate of the present invention may include any other member (layer) in addition to the resin substrate and the PVA-based resin layer, though the member (layer) is not shown. Examples of the other member (layer) include an optical functional film, a pressure-sensitive adhesive layer, an adhesive layer, and an easy-adhesion layer. The pressure-sensitive adhesive layer is typically formed of an acrylic pressure-sensitive adhesive. The adhesive layer is typically formed of a PVA-based adhesive. The optical functional film can function as, for example, a polarizing film protective film or a retardation film. The laminate 10 typically has long shape. The thickness of the laminate, which varies depending on its construction, is typically from 20 μm to 500 μm.

The PVA-based resin layer of the laminate of the present invention has an extremely small number of air bubble defects because the laminate is obtained by the production method described in the section A. More specifically, the number of the air bubble defects of the PVA-based resin layer is 1 defect/m$^2$ or less, preferably 0.7 defect/m$^2$ or less, more preferably 0.1 defect/m$^2$ or less, still more preferably 0.05 defect/m$^2$ or less. A thin polarizing film excellent in quality and optical characteristics can be obtained because the number of the air bubble defects of the PVA-based resin layer in the laminate is markedly small as described above.

EXAMPLES

Hereinafter, the present invention is specifically described by way of Examples. However, the present invention is not limited to these Examples.

Example 1

Figure 4:
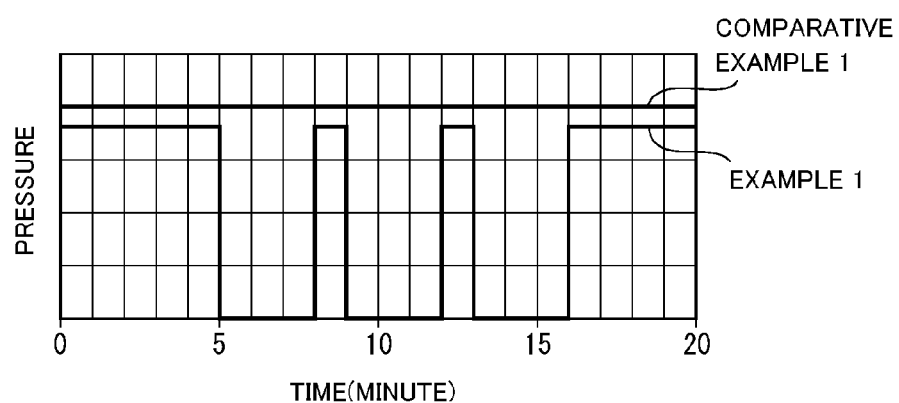
FIG. 4 is a graph showing comparison between the pressure fluctuation profiles of Example and Comparative Example.

PVA powder having a polymerization degree of 4,200 and a saponification degree of 99.2% was dissolved in water to prepare a PVA aqueous solution having a concentration of 7%. The viscosity of the PVA aqueous solution was measured with a B-type viscometer (manufactured by Toki Sangyo Co., Ltd.) at 23° C. and a number of rotations of a rotor of 20 rpm. The viscosity of the PVA aqueous solution was 2,000 mPa·s. Meanwhile, such a circulating system as illustrated in FIG. 1 was built, in which a tank, a liquid-feeding pump, and filters were provided in series, and the PVA aqueous solution supplied from the tank to the filters by the liquid-feeding pump returned to the tank after passing the filters. Twelve depth-type cartridge filters (manufactured by ROKI TECHNO CO., LTD., product name: SLOPE-PURE, filtration accuracy: 75 μm, size: 20 inches) were used as the filters. The PVA aqueous solution prepared in the foregoing was circulated in the circulating system for 1 hour. More specifically, the PVA aqueous solution was charged into the tank, supplied to the filters by the liquid-feeding pump (liquid-feeding amount: 10 L/min), and returned to the tank after passing the filters. The foregoing was defined as 1 cycle and the cycle was repeated for 1 hour. At that time, a pressure was fluctuated in accordance with such a profile as shown in FIG. 4 by intermittently stopping the liquid-feeding pump. Here, a difference between the pressure at the time of the operation of the pump and that at the time of the stopping of the pump was set to 0.18 MPa. It should be noted that FIG. 4 shows a pressure profile for 20 minutes and the cycle was repeated three times in this example. An air bubble removal ratio after the PVA aqueous solution had been circulated for 60 minutes was calculated with ultrasonic sensors (not shown: manufactured by NISSIN ELECTRONIC CO., LTD., product name: BC Meter) placed upstream and downstream of the filters from the following equation.

Air bubble removal ratio (%)=(number of air bubbles after passage through filters after lapse of 60 minutes)/(number of air bubbles before initial passage through filters)×100

A commercial polyethylene terephthalate film (manufactured by Mitsubishi Plastics, Inc., tradename: SH046, Tg: 70° C., thickness: 200 μm) was used as a resin substrate without being treated. The PVA aqueous solution from which air bubbles had been removed as described above was applied to one surface of the resin substrate with a slot die coater and then dried at a temperature of 60° C. to form a PVA-based resin layer having a thickness of 10 μm. The number of the external appearance defects (air bubble defects) of the formed PVA-based resin layer was visually observed and then converted into a number per 1 m$^2$. Table 1 shows the result of the evaluation.

Example 2

The removal of air bubbles from the PVA solution was performed and then a PVA-based resin layer was formed in the same manner as in Example 1 except that a depth-type filter having a filtration accuracy of 50 μm (manufactured by Sumitomo 3M Limited, product name: Betapure) was used. Further, the same evaluation as that of Example 1 was performed. Table 1 shows the result.

Example 3

The removal of air bubbles from the PVA solution was performed and then a PVA-based resin layer was formed in the same manner as in Example 1 except that a depth-type filter having a filtration accuracy of 100 μm (manufactured by Sumitomo 3M Limited, product name: Betapure) was used. Further, the same evaluation as that of Example 1 was performed. Table 1 shows the result.

Comparative Example 1

The removal of air bubbles from the PVA solution was performed and then a PVA-based resin layer was formed in the same manner as in Example 1 except that the liquid-feeding pump was not stopped and the pressure was kept constant as shown in FIG. 4. Further, the same evaluation as that of Example 1 was performed. Table 1 shows the result.

Comparative Example 2

The removal of air bubbles from the PVA solution was performed and then a PVA-based resin layer was formed in the same manner as in Example 1 except that a depth-type filter having a filtration accuracy of 20 μm (manufactured by Sumitomo 3M Limited, product name: PolyPro-Klean) was used. Further, the same evaluation as that of Example 1 was performed. Table 1 shows the result.

Comparative Example 3

The removal of air bubbles from the PVA solution was performed and then a PVA-based resin layer was formed in the same manner as in Example 1 except that a pleated filter having a filtration accuracy of 70 μm (manufactured by Nihon Pall Ltd., product name: Profile UP) was used. Further, the same evaluation as that of Example 1 was performed. Table 1 shows the result.

TABLE 1

| | Filtration accuracy (μm) | Filter structure | Pressure difference (MPa) | Pressure fluctuation | Air bubble removal ratio (%) | Number of air bubble defects (defect(s)/m²) |
|---|---|---|---|---|---|---|
| Example 1 | 75 | Depth | 0.18 | Present | 95 | 0.03 |
| Example 2 | 50 | Depth | 0.21 | Present | 90.3 | 0.6 |
| Example 3 | 100 | Depth | 0.16 | Present | 96 | 0.015 |
| Comparative Example 1 | 75 | Depth | 0 | Absent | 84 | 1 |
| Comparative Example 2 | 20 | Depth | 0.26 | Present | 76.5 | 1.5 |
| Comparative Example 3 | 70 | Pleated | 0.16 | Present | 77 | 1.4 |

As is apparent from Table 1, according to Examples of the present invention, significantly good results were obtained in terms of both the air bubble removal ratio and the number of the air bubble defects of the PVA-based resin layer as compared to those of Comparative Examples.

Example 4

The laminate obtained in Example 1 was immersed in a bath having a liquid temperature of 30° C. (an aqueous solution of boric acid obtained by compounding 100 parts by weight of water with 4 parts by weight of boric acid) for 30 seconds (insolubilizing step).

Next, the laminate was immersed in a dyeing bath having a liquid temperature of 30° C. (an aqueous solution of iodine obtained by compounding 100 parts by weight of water with 0.2 part by weight of iodine and 2 parts by weight of potassium iodide) for 60 seconds (dyeing step).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking step).

After that, the laminate was subjected to uniaxial stretching in its longitudinal direction (lengthwise direction) between rolls having different peripheral speeds while being immersed in an aqueous solution of boric acid having a liquid temperature of 60° C. (an aqueous solution obtained by compounding 100 parts by weight of water with 4 parts by weight of boric acid and 5 parts by weight of potassium iodide) (stretching step). The time period for which the laminate was immersed in the aqueous solution of boric acid was 120 seconds and a stretching ratio was set to 5.0 times.

After that, the laminate was immersed in a washing bath (an aqueous solution obtained by compounding 100 parts by weight of water with 3 parts by weight of potassium iodide) and then dried with warm air at 60° C. (washing/drying step).

Thus, a laminate having a polarizing film having a thickness of 5 μm formed on a resin substrate was obtained. It was confirmed that the resultant polarizing film had no optical defects. Further, the resultant polarizing film showed no variation in quality and had an extremely high yield.

Example 5

A laminate including a polarizing film having a thickness of 5 μm formed on a resin substrate was obtained in the same manner as in Example 4 except that the laminate obtained in Example 2 was used. It was confirmed that the resultant polarizing film had no optical defects. Further, the resultant polarizing film showed no variation in quality and had an extremely high yield.

Example 6

A laminate including a polarizing film having a thickness of 5 μm formed on a resin substrate was obtained in the same manner as in Example 4 except that the laminate obtained in Example 3 was used. It was confirmed that the resultant polarizing film had no optical defects. Further, the resultant polarizing film showed no variation in quality and had an extremely high yield.

Comparative Example 4

A laminate including a polarizing film having a thickness of 5 μm formed on a resin substrate was obtained in the same manner as in Example 4 except that the laminate obtained in Comparative Example 1 was used. It was found that the resultant polarizing film had optical defects. Further, the resultant polarizing film showed a variation in quality and had a low yield owing to the optical defects.

Comparative Example 5

A laminate including a polarizing film having a thickness of 5 μm formed on a resin substrate was obtained in the same manner as in Example 4 except that the laminate obtained in Comparative Example 2 was used. It was found that the resultant polarizing film had optical defects. Further, the resultant polarizing film showed a variation in quality and had a low yield owing to the optical defects.

Comparative Example 6

A laminate including a polarizing film having a thickness of 5 μm formed on a resin substrate was obtained in the same manner as in Example 4 except that the laminate obtained in Comparative Example 3 was used. It was found that the resultant polarizing film had optical defects. Further, the resultant polarizing film showed a variation in quality and had a low yield owing to the optical defects.

The laminate obtained by the production method of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens.

According to an embodiment of the present invention, in the production of a laminate including a polyvinyl alcohol (PVA)-based resin layer, the air bubbles of an application liquid for forming the PVA-based resin layer can be removed by using a depth-type filter having relatively low filtration accuracy and by fluctuating a pressure applied to the application liquid supplied to the filter to remove air bubbles in the filter. As a result, a laminate having a markedly small number of external appearance defects (air bubble defects) can be obtained. In addition, the production method of the present invention is excellent in productivity because the air bubble-removing operation can be performed within a short time period. As a result, according to an embodiment of the present invention, a thin polarizing film excellent in quality and optical characteristics can be obtained with high productivity.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A method of producing a laminate, comprising applying an application liquid containing a polyvinyl alcohol-based resin to one side of a resin substrate, followed by drying of the application liquid to form a polyvinyl alcohol-based resin layer, the method comprising:

passing the application liquid before the application through a depth-type filter having a filtration accuracy of from 50 μm to 100 μm; and fluctuating a pressure applied to the application liquid supplied to the depth-type filter to remove air bubbles in the filter.

2. A method of producing a laminate according to claim 1, wherein the fluctuating of the pressure is performed by intermittently stopping a pump for supplying the application liquid to the depth-type filter.

3. A method of producing a laminate according to claim 1, wherein a difference between a maximum pressure and a minimum pressure in the fluctuating of the pressure is from 0.10 MPa to 0.25 MPa.

4. A method of producing a laminate according to claim 1, wherein the application liquid has a viscosity of from 100 mPa·s to 10,000 mPa·s.

5. A method of producing a laminate according to claim 1, further comprising stretching the resin substrate having formed thereon the polyvinyl alcohol-based resin layer.

* * * * *